(12) United States Patent
Raichelgauz et al.

(10) Patent No.: US 11,537,636 B2
(45) Date of Patent: Dec. 27, 2022

(54) SYSTEM AND METHOD FOR USING MULTIMEDIA CONTENT AS SEARCH QUERIES

(71) Applicant: Cortica Ltd.

(72) Inventors: Igal Raichelgauz, Tel Aviv (IL);
Karina Odinaev, Tel Aviv (IL);
Yehoshua Y. Zeevi, Haifa (IL)

(73) Assignee: CORTICA, LTD., Tel-Aviv (IL)

( * ) Notice: Subject to any disclaimer, the term of this patent is extended or adjusted under 35 U.S.C. 154(b) by 616 days.

(21) Appl. No.: 16/576,818

(22) Filed: Sep. 20, 2019

(65) Prior Publication Data

US 2020/0226152 A1    Jul. 16, 2020

Related U.S. Application Data

(63) Continuation-in-part of application No. 13/682,132, filed on Nov. 20, 2012, now Pat. No. 8,990,125, and
(Continued)

(30) Foreign Application Priority Data

Aug. 21, 2007  (IL) .......................................... 185414

(51) Int. Cl.
*G06F 16/174*  (2019.01)
*G06F 16/22*   (2019.01)
(Continued)

(52) U.S. Cl.
CPC ............ *G06F 16/284* (2019.01); *G06F 3/048* (2013.01); *G06F 16/1748* (2019.01);
(Continued)

(58) Field of Classification Search
CPC .... G06F 16/284; G06F 3/048; G06F 16/1748; G06F 16/2228; G06F 16/285;
(Continued)

(56) References Cited

U.S. PATENT DOCUMENTS 6,640,015 B1   10/2003  Lafruit
7,801,893 B2   9/2010   Gulli
(Continued)

OTHER PUBLICATIONS

Lin et al., Generating Robust Digital Signature for Image/Video Authentication, Sep. 1998, ACM, pp. 1-6 (Year: 1998).*
(Continued)

*Primary Examiner* — Jorge A Casanova
(74) *Attorney, Agent, or Firm* — Reches Patents

(57) ABSTRACT

There is provided a method for searching a plurality of information sources using a multimedia element, the method may include receiving at least one multimedia element; generating, by a signature generator, for the at least one multimedia element at least one signature that is unidirectional, and yields compression; generating at least one textual search query using the at least one signature; wherein the generating of the textual search query comprises: (a) searching for at least one matching stored signature that matches one or more of the at least one signature; and (b) using a mapping between stored signatures and textual search queries, selecting at least one textual search query mapped to at least one matching stored signature; searching the plurality of information sources using the at least one textual search query; and causing a display of search results retrieved from the plurality of information sources.

16 Claims, 5 Drawing Sheets

Related U.S. Application Data a continuation-in-part of application No. 13/344,400, filed on Jan. 5, 2012, now Pat. No. 8,959,037, and a continuation of application No. 12/434,221, filed on May 1, 2009, now Pat. No. 8,112,376, said application No. 13/682,132 is a continuation of application No. 12/195,863, filed on Aug. 21, 2008, now Pat. No. 8,326,775.

(51) Int. Cl.

| | |
|---|---|
| *G06F 16/28* | (2019.01) |
| *G06F 16/35* | (2019.01) |
| *G06F 16/40* | (2019.01) |
| *G06F 16/41* | (2019.01) |
| *G06F 16/43* | (2019.01) |
| *G06F 16/432* | (2019.01) |
| *G06F 16/438* | (2019.01) |
| *G06F 16/48* | (2019.01) |
| *G06F 16/51* | (2019.01) |
| *G06F 16/683* | (2019.01) |
| *G06F 16/783* | (2019.01) |
| *G06F 16/904* | (2019.01) |
| *G06F 3/048* | (2013.01) |
| *G06N 5/02* | (2006.01) |
| *G06T 19/00* | (2011.01) |
| *G06V 20/40* | (2022.01) |
| *G10L 15/26* | (2006.01) |
| *G10L 15/32* | (2013.01) |
| *H04H 20/10* | (2008.01) |
| *H04H 20/26* | (2008.01) |
| *H04H 60/37* | (2008.01) |
| *H04H 60/56* | (2008.01) |
| *H04H 60/66* | (2008.01) |
| *H04L 67/10* | (2022.01) |
| *H04N 21/258* | (2011.01) |
| *H04N 21/2668* | (2011.01) |
| *H04N 21/466* | (2011.01) |
| *H04N 21/81* | (2011.01) |
| *H04N 7/173* | (2011.01) |
| *H04H 60/46* | (2008.01) |

(52) U.S. Cl.
CPC ........ *G06F 16/2228* (2019.01); *G06F 16/285* (2019.01); *G06F 16/35* (2019.01); *G06F 16/40* (2019.01); *G06F 16/41* (2019.01); *G06F 16/43* (2019.01); *G06F 16/433* (2019.01); *G06F 16/434* (2019.01); *G06F 16/438* (2019.01); *G06F 16/4393* (2019.01); *G06F 16/48* (2019.01); *G06F 16/51* (2019.01); *G06F 16/683* (2019.01); *G06F 16/685* (2019.01); *G06F 16/7834* (2019.01); *G06F 16/7844* (2019.01); *G06F 16/7847* (2019.01); *G06F 16/904* (2019.01); *G06N 5/02* (2013.01); *G06N 5/025* (2013.01); *G06T 19/006* (2013.01); *G06V 20/46* (2022.01); *G10L 15/26* (2013.01); *H04H 20/103* (2013.01); *H04H 20/26* (2013.01); *H04H 60/37* (2013.01); *H04H 60/46* (2013.01); *H04H 60/56* (2013.01); *H04H 60/66* (2013.01); *H04L 67/10* (2013.01); *H04N 7/17318* (2013.01); *H04N 21/25891* (2013.01); *H04N 21/2668* (2013.01); *H04N 21/466* (2013.01); *H04N 21/8106* (2013.01); *G10L 15/32* (2013.01); *Y10S 707/99943* (2013.01); *Y10S 707/99948* (2013.01)

(58) Field of Classification Search
CPC .......... G06F 16/35; G06F 16/40; G06F 16/41; G06F 16/43; G06F 16/433; G06F 16/434; G06F 16/438; G06F 16/4393; G06F 16/48; G06F 16/51; G06F 16/683; G06F 16/685; G06F 16/7834; G06F 16/7844; G06F 16/7847; G06F 16/904; G06F 16/432; G06N 5/02; G06N 5/025; G06T 19/006; G06V 20/46; G06V 2201/08; G06V 2201/10; G10L 15/26; G10L 15/32; H04H 20/103; H04H 20/26; H04H 60/37; H04H 60/46; H04H 60/56; H04H 60/66; H04L 67/10; H04N 7/17318; H04N 21/25891; H04N 21/2668; H04N 21/466; H04N 21/8106; H04N 21/23418; H04N 21/2665; H04N 21/6582; H04N 21/4828; Y10S 707/99943; Y10S 707/99948

See application file for complete search history.

(56) References Cited

U.S. PATENT DOCUMENTS

| | | |
|---|---|---|
| 8,275,764 B2 | 9/2012 | Jeon |
| RE44,225 E | 5/2013 | Aviv |
| 8,527,978 B1 | 9/2013 | Sallam |
| 8,634,980 B1 | 1/2014 | Urmson |
| 8,781,152 B2 | 7/2014 | Momeyer |
| 8,782,077 B1 | 7/2014 | Rowley |
| 9,298,763 B1 | 3/2016 | Zack |
| 9,440,647 B1 | 9/2016 | Sucan |
| 9,734,533 B1 | 8/2017 | Givot |
| 10,133,947 B2 | 11/2018 | Yang |
| 10,347,122 B2 | 7/2019 | Takenaka |
| 10,491,885 B1 | 11/2019 | Hicks |
| 2003/0037010 A1 | 2/2003 | Schmelzer |
| 2004/0059736 A1 | 3/2004 | Willse |
| 2004/0091111 A1 | 5/2004 | Levy |
| 2004/0230572 A1 | 11/2004 | Omoigui |
| 2005/0193015 A1 | 9/2005 | Logston |
| 2006/0100987 A1 | 5/2006 | Leurs |
| 2006/0120626 A1 | 6/2006 | Perlmutter |
| 2006/0251339 A1 | 11/2006 | Gokturk |
| 2007/0196013 A1 | 8/2007 | Li |
| 2008/0109433 A1 | 5/2008 | Rose |
| 2008/0152231 A1 | 6/2008 | Gokturk |
| 2008/0166020 A1 | 7/2008 | Kosaka |
| 2008/0270569 A1 | 10/2008 | McBride |
| 2008/0294278 A1 | 11/2008 | Borgeson |
| 2009/0022472 A1 | 1/2009 | Bronstein |
| 2009/0034791 A1 | 2/2009 | Doretto |
| 2009/0043818 A1 | 2/2009 | Raichelgauz |
| 2009/0080759 A1 | 3/2009 | Bhaskar |
| 2009/0216761 A1 | 8/2009 | Raichelgauz |
| 2009/0278934 A1 | 11/2009 | Ecker |
| 2010/0042646 A1 | 2/2010 | Raichelgauz |
| 2010/0082684 A1 | 4/2010 | Churchill |
| 2010/0111408 A1 | 5/2010 | Matsuhira |
| 2010/0306193 A1 | 12/2010 | Pereira |
| 2011/0029620 A1 | 2/2011 | Bonforte |
| 2011/0038545 A1 | 2/2011 | Bober |
| 2011/0246566 A1 | 10/2011 | Kashef |
| 2012/0133497 A1 | 5/2012 | Sasaki |
| 2012/0179751 A1 | 7/2012 | Ahn |
| 2013/0103814 A1 | 4/2013 | Carrasco |
| 2013/0212493 A1 | 8/2013 | Krishnamurthy |
| 2013/0226820 A1 | 8/2013 | Sedota, Jr. |
| 2014/0025692 A1 | 1/2014 | Pappas |
| 2014/0059443 A1 | 2/2014 | Tabe |
| 2014/0095425 A1 | 4/2014 | Sipple |
| 2014/0111647 A1 | 4/2014 | Atsmon |
| 2014/0201330 A1 | 7/2014 | Lozano Lopez |
| 2014/0379477 A1 | 12/2014 | Sheinfeld |
| 2015/0033150 A1 | 1/2015 | Lee |

(56) References Cited

U.S. PATENT DOCUMENTS

| | | |
|---|---|---|
| 2015/0117784 A1 | 4/2015 | Lin |
| 2015/0134688 A1 | 5/2015 | Jing |
| 2015/0363644 A1 | 12/2015 | Wnuk |
| 2016/0210525 A1 | 7/2016 | Yang |
| 2016/0221592 A1 | 8/2016 | Puttagunta |
| 2016/0342683 A1 | 11/2016 | Kwon |
| 2016/0357188 A1 | 12/2016 | Ansari |
| 2017/0032257 A1 | 2/2017 | Sharifi |
| 2017/0041254 A1 | 2/2017 | Agara Venkatesha Rao |
| 2017/0109602 A1 | 4/2017 | Kim |
| 2017/0255620 A1 | 9/2017 | Raichelgauz |
| 2017/0262437 A1 | 9/2017 | Raichelgauz |
| 2017/0323568 A1 | 11/2017 | Inoue |
| 2018/0081368 A1 | 3/2018 | Watanabe |
| 2018/0101177 A1 | 4/2018 | Cohen |
| 2018/0157916 A1 | 6/2018 | Doumbouya |
| 2018/0158323 A1 | 6/2018 | Takenaka |
| 2018/0204111 A1 | 7/2018 | Zadeh |
| 2019/0005726 A1 | 1/2019 | Nakano |
| 2019/0039627 A1 | 2/2019 | Yamamoto |
| 2019/0043274 A1 | 2/2019 | Hayakawa |
| 2019/0045244 A1 | 2/2019 | Balakrishnan |
| 2019/0056718 A1 | 2/2019 | Satou |
| 2019/0065951 A1 | 2/2019 | Luo |
| 2019/0188501 A1 | 6/2019 | Ryu |
| 2019/0220011 A1 | 7/2019 | Della Penna |
| 2019/0317513 A1 | 10/2019 | Zhang |
| 2019/0364492 A1 | 11/2019 | Azizi |
| 2019/0384303 A1 | 12/2019 | Muller |
| 2019/0384312 A1 | 12/2019 | Herbach |
| 2019/0385460 A1 | 12/2019 | Magzimof |
| 2019/0389459 A1 | 12/2019 | Berntorp |
| 2020/0004248 A1 | 1/2020 | Healey |
| 2020/0004251 A1 | 1/2020 | Zhu |
| 2020/0004265 A1 | 1/2020 | Zhu |
| 2020/0005631 A1 | 1/2020 | Visintainer |
| 2020/0018606 A1 | 1/2020 | Wolcott |
| 2020/0018618 A1 | 1/2020 | Ozog |
| 2020/0020212 A1 | 1/2020 | Song |
| 2020/0050973 A1 | 2/2020 | Stenneth |
| 2020/0073977 A1 | 3/2020 | Montemerlo |
| 2020/0090484 A1 | 3/2020 | Chen |
| 2020/0097756 A1 | 3/2020 | Hashimoto |
| 2020/0133307 A1 | 4/2020 | Kelkar |
| 2020/0043326 A1 | 6/2020 | Tao |

OTHER PUBLICATIONS

Jasinschi et al., A Probabilistic Layered Framework for Integrating Multimedia Content and Context Information, 2002, IEEE, p. 2057-2060. (Year: 2002).

Jones et al., "Contextual Dynamics of Group-Based Sharing Decisions", 2011, University of Bath, p. 1777-1786. (Year: 2011).

Iwamoto, "Image Signature Robust to Caption Superimpostion for Video Sequence Identification", IEEE, pp. 3185-3188 (Year: 2006).

Cooperative Multi-Scale Convolutional Neural, Networks for Person Detection, Markus Eisenbach, Daniel Seichter, Tim Wengefeld, and Horst-Michael Gross Ilmenau University of Technology, Neuroinformatics and Cognitive Robotics Lab (Year: 2016).

Chen, Yixin, James Ze Wang, and Robert Krovetz. "Clue: cluster-based retrieval of images by unsupervised learning." IEEE transactions on Image Processing 14.8 (2005); 1187-1201. (Year: 2005).

Wusk et al (Non-Invasive detection of Respiration and Heart Rate with a Vehicle Seat Sensor; www.mdpi.com/journal/sensors; Published: May 8, 2018). (Year: 2018).

Chen, Tiffany Yu-Han, et al. "Glimpse: Continuous, real-time object recognition on mobile devices." Proceedings of the 13th Acm Confrecene on Embedded Networked Sensor Systems. 2015. (Year: 2015).

* cited by examiner

SYSTEM AND METHOD FOR USING MULTIMEDIA CONTENT AS SEARCH QUERIES

CROSS-REFERENCE TO RELATED APPLICATIONS

This application is a continuation-in-part (CIP) of:
(a) U.S. patent application Ser. No. 13/344,400 filed on Jan. 5, 2012, now, which is a continuation of U.S. patent application Ser. No. 12/434,221, filed May 1, 2009, now U.S. Pat. No. 8,112,376;
(b) U.S. patent application Ser. No. 13/682,132 filed Nov. 20, 2012, which is a continuation application of U.S. patent application Ser. No. 12/195,863, filed Aug. 21, 2008, now U.S. Pat. No. 8,326,775. The Ser. No. 12/195,863 application claims priority under 35 USC 119 from Israeli Application No. 185414, filed on Aug. 21, 2007, and is also a continuation-in-part of the below-referenced U.S. patent application Ser. No. 12/084,150

All of the applications referenced above are herein incorporated by reference for all that they contain.

TECHNICAL FIELD

The present invention relates generally to the analysis of multimedia content, and more specifically to search information resources using multimedia content.

BACKGROUND

Web search engines are used for searching for information over the World Wide Web. A web search query refers to a query that a user enters into a web search engine in order to receive search results.

Users of the web from all around the world naturally enter different search queries. Consequently, the task of finding relevant and appropriate search results respective of a search query has become increasingly complex due to common language differences. Furthermore, often is the case where a user seeks information, but cannot accurately express the objective of the search when using a textual query.

It would be therefore advantageous to provide a solution that overcomes the deficiencies of the prior art by providing search results respective of multimedia content received as a search query.

SUMMARY

Certain embodiments disclosed herein include a method for searching a plurality of information sources using a multimedia element. The method comprises receiving at least one multimedia element; generating at least one signature for the at least one multimedia element; generating a textual search query using at least the one generated signature; searching the plurality of information sources using the generated textual search query; and causing the display of search results retrieved from the plurality of information sources on a user device.

Certain embodiments disclosed herein also include a system searching a plurality of information sources using a multimedia element. The system comprises an interface to a network for receiving at least one multimedia element; and a query generator for generating a textual search query using at least one signature of the received at least one multimedia element, wherein the query generator is further configured to; search the plurality of information sources using the generated textual search query; and cause the display of search results retrieved from the plurality of information sources on a user device.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
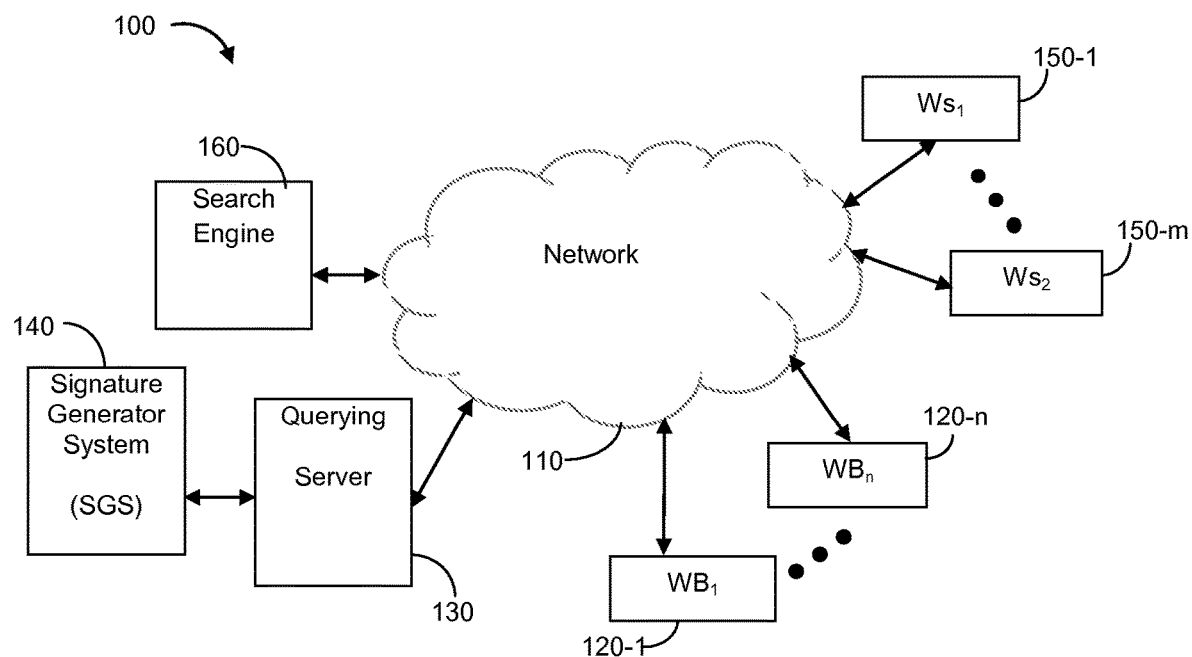
FIG. 1 is a schematic block diagram of a network system utilized to describe the various embodiments disclosed herein.

It is important to note that the embodiments disclosed herein are merely examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Certain exemplary embodiments disclosed herein allow providing appropriate search results respective of a multimedia element received as a search query. By analyzing the multimedia element received, one or more matching signatures are generated. The signatures are utilized in part to search for appropriate search result(s) to be displayed on a user device.

FIG. 1 shows an exemplary and non-limiting schematic diagram of a system 100 utilized to describe the various embodiments of the invention. As illustrated in FIG. 1, a network 110 enables the communication between different parts of the system. The network 110 may be the Internet, the world-wide-web (WWW), a local area network (LAN), a wide area network (WAN), a metro area network (MAN), and other networks capable of enabling communication between the elements of the system 100.

Further connected to the network 110 are client applications, such as web browsers (WB) 120-1 through 120-*n* (collectively referred to hereinafter as web browsers 120 or individually as a web browser 120). A web browser 120 is executed over a computing device which may be, for example, a personal computer (PC), a personal digital assistant (PDA), a mobile phone, a tablet computer, and the like.

The computing device is configured to at least provide multimedia elements to servers connected to the network 110.

The multimedia elements provided by a computing device can be locally saved in the computing device or can be captured by the device. For example, the multimedia image may be an image captured by a camera installed in the client device, a video clip saved in the device, and so on. A multimedia element may be, for example, an image, a graphic, a video stream, a video clip, an audio stream, an audio clip, a video frame, a photograph, and an image of signals (e.g., spectrograms, phasograms, scalograms, etc.), and/or combinations thereof and portions thereof.

The system 100 also includes a plurality of information sources 150-1 through 150-m (collectively referred to hereinafter as information sources 150 or individually as an information sources 150) being connected to the network 110. Each of the information sources 150 may be, for example, a web server, an application server, a data repository, a database, and the like. Also connected to the network 110 is a search engine 160 that is configured to search the one or more information sources 150 based on an input textual search query. The search results may be provided directly to a web browser 120 or to a querying server 130.

The various embodiments disclosed herein are realized using the querying server 130 and a signature generator system (SGS) 140. The querying sever 130 generates at least a textual search query respective of a multimedia element provided by a client device by means of a web browser 120. The generated textual search query is input to the search engine 160, which searches the information resources 150 as noted above.

In one embodiment, the search results generated by the search engine 160 are provided to the querying server 130 which filters the results based in part on the signature generated for the input multimedia element. The filtered results are sent to the web browser for display thereon. In another embodiment, the textual search query generated by querying server 130 can be returned to the web browser 120 to initiate a search by a user of the browser 120. In this embodiment, the textual search query may be embedded with a hypertext reference to a search engine. That is, by clicking on the returned query, search results from the referenced search engine are retrieved and displayed on the web browser 120.

In another embodiment, the querying server 130 is configured to directly query the information sources 150 using a textual search query generated respective of an input multimedia element. The input multimedia element may be uploaded by a user through the web browser of a retrieved multimedia warehouse (not shown).

The SGS 140 is configured to generate a signature respective of the multimedia elements fed by the querying server 130. The process for generating the signatures is explained in more detail herein below with respect to FIGS. 4 and 5. Each of the querying server 130 and the SGS 140 typically is comprised of a processing unit, such as processor (not shown) that is coupled to a memory. The memory contains instructions that can be executed by the processing unit. The querying server 130 also includes an interface (not shown) to the network 110.

A user can provide an input multimedia element to perform the search through a web site that enables uploading of a multimedia element to the querying server 130. The uploaded multimedia element may be a file or a link to a location of the multimedia element. The uploaded multimedia element may also include a request to provide search results or a query respective of the uploaded multimedia element. In another embodiment, the multimedia element can be generated and sent by a script executed in the web page visited by the web browser 120, or an add-on (not shown) installed in the web browser.

The querying server 130 analyzes the received multimedia element or one or more portions thereof, to detect one or more appropriate search results respectively. It should be noted that the querying server 130 may analyze all or a sub-set of the multimedia elements. The SGS 140 generates at least one signature for the multimedia element or each portion thereof, provided by the querying server 130. The generated signature(s) may be robust to noise and distortions as discussed below. Then, using the signature(s) provided by the SGS 140, the querying server 130 generates a textual search query.

In one embodiment, in order to generate a textual search query, the signature provided by the SGS 140 is checked against a query database (not shown) that maintains mappings between signatures and text queries. That is, the query database maintains for each signature a matching query. It should be noted that different signatures can be mapped to the same query. For example, a picture of a car make BMW and model X3 can be taken from different angles, or the same type of car can be presented in different colors. In the query database accessed by the querying server 130, signatures of images of a car make BMW and model X3 are mapped to one text query, for example, "BMW X3 model". If the server 130 receives a signature that is not found in the query database, a similar signature in the query database is first detected. A similar signature can be detected based, in part, on the context of the multimedia element and the generated signature. An exemplary technique for determining a context of a multimedia element based on signatures is described in detail in U.S. patent application Ser. No. 13/770,603, filed Feb. 19, 2013, which is assigned to common assignee, which is hereby incorporated by reference for all the useful information it contains.

In another embodiment, the querying server 130 optimizes the generated query using information related, for example, to the user's behavior, demographic information, intent, and so on. For example, using the additional information, the server 130 may generate a textual search query "BMW X3 model car dealerships in the bay area." The text of "car dealerships in the bay area" is provided in response to the analyzed user's behavior (the user is currently shopping for new cars) and on user's location (Bay Area) derived from the demographic information. In yet another embodiment, the signatures generated by the SGS 140 for more than one multimedia element or portions of an element are clustered. The clustered signatures can be utilized to create a textual search query or to search the information resources 150.

It should be appreciated that using signatures to generate the textual search queries allows the retrieval and reorganization of accurate results including, but not limited to, multimedia elements in comparison to utilization of metadata. The signatures generated by the SGS 140 for the multimedia elements allow for recognition and classification of multimedia elements, such as, content-tracking, video filtering, multimedia taxonomy generation, video fingerprinting, speech-to-text, audio classification, element recognition, video/image search and any other application requiring content-based signatures generation and matching for large content volumes such as, web and other large-scale databases. For example, a signature generated by the SGS 140 for a picture showing a car, enables accurate recognition of the model of the car from any angle from which the picture was taken.

In one embodiment, the generated signatures can be utilized to search one or more of the information resources for a matching search result. In a particular embodiment the retrieval of search results by means of the signatures generated by the SGS 140 may be performed from data sources that index searchable content including, but not limited to, multimedia content using signatures and concepts. A context is determined as the correlation between a plurality of concepts. An example for such indexing techniques using signatures is disclosed in a co-pending U.S. patent application Ser. No. 13/766,463, filed Feb. 13, 2013, entitle "A SYSTEM AND METHODS FOR GENERATION OF A CONCEPT BASED DATABASE", assigned to common assignee, is hereby incorporated by reference for all the useful information it contains.

The querying server 130 can also enable the selection of a portion of a multimedia element as a search query. For instance, in order to provide appropriate search results for sunglasses of a specific brand, which is shown within an image of several people walking on a sea shore, the user may select only the sunglasses in order to search for additional relevant products. The selection of one or more portions is an enabled on a multimedia element provided as an initial query or multimedia element returned in response to the initial query. The selection of a portion of the multimedia element may be performed using, for example, a user's gesture or a text query.

The system 100 may be configured to generate customized channels of multimedia content. Accordingly, a web browser 120 or a client channel manager application (not shown), available on either the querying server 130, on the web browser 120, or as an independent or plug-in application, may enable a user to create customized channels of multimedia content. Such customized channels of multimedia content are personalized content channels that are generated in response to selections made by a user of the web browser 120 or the client channel manager application. The system 100, and in particular the querying server 130 in conjunction with the SGS 140, determines which multimedia content is more suitable to be viewed, played or otherwise utilized by the user with respect to a given channel, based on the signatures of selected multimedia content. These channels may optionally be shared with other users, used and/or further developed cooperatively, and/or sold to other users or providers, and so on. The process for defining, generating and customizing the channels of multimedia content are described in greater detail in the co-pending U.S. patent application Ser. No. 13/344,400 referenced above.

Figure 2:
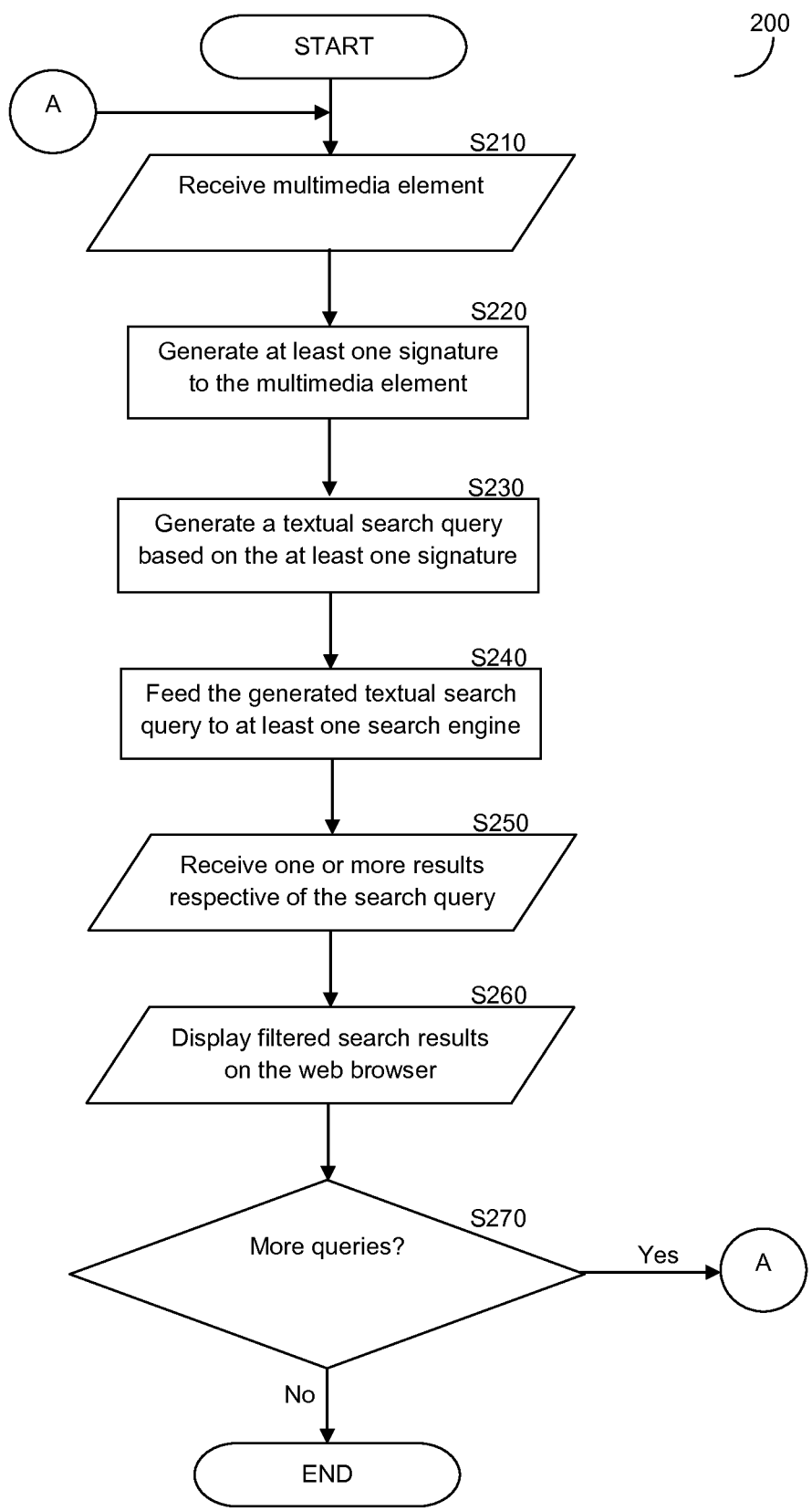
FIG. 2 is a flowchart describing a process for generating a textual search query and for searching information resources respective of input multimedia elements according to one embodiment.

FIG. 2 depicts an exemplary and non-limiting flowchart 200 describing a process for generating a textual search query and performing a search respective of a multimedia element according to an embodiment. At S210, the querying server 130 receives a multimedia element or one or more portions thereof. The multimedia element may be sent together with a search request from a web-browser, for example, the web browser 120-1.

According to one embodiment, the querying server 130 is further configured to receive additional parameters to enhance the search operation. The additional parameters are received, for example, through an overlay object created by the querying server 130 over the multimedia element. The overlay may include a search box or other interactive object. The additional parameters, provided as part of the search request, may be, for example, a specific portion within the multimedia element or other conditions respective thereto. The request can be received from a script running on the uploaded web-page, or an agent (e.g., an add-on) installed in the web-browser 120-1.

In S220, at least one signature respective of the input multimedia element is generated. The signature for the multimedia element is generated by the SGS 140 as described below. S220 can also include identification of the context of the multimedia element respective of the generated signature. As noted above, the signature may be robust to noise and distortions. A signature can be generated for each portion identified in the input multimedia element. The input multimedia element may include, for example, an image, a graphic, a video stream, a video clip, an audio stream, an audio clip, a video frame, a photograph, and an image of signals (e.g., spectrograms, phasograms, scalograms, etc.), and/or combinations thereof and portions thereof.

In S230, a textual search query is generated based on the least one signature. The textual search query can also be generated based on the context of the multimedia element. As discussed in detail earlier, this can be performed by searching the query database for a query that maps to the generated signature or a similar signature. For example, the search of the query database may be based on the context of the multimedia element. In one embodiment, the matching query found in the query database can be optimized using any one of the behavior and demographic information related to a user providing the input element.

In S240, the generated textual search query is fed to at least one search engine 160 to search for information respective of the search query. Alternatively, as discussed above, the textual search query may be returned to the web browser together with an embedded link to a search engine. In another embodiment, S240 includes searching the one or more information sources 150 using the signature(s). Such a search is performed by the querying server 130 which queries sources 150 using the generated signature(s). Alternatively or collectively, the search may be performed by the querying sever 130 using the generated textual search. It should be noted that any of the techniques described in S240 can be utilized to search for appropriate results. That is, the search may be initiated by the search engine 160, the querying server 130 using signatures and/or textual queries, or by both the engine 160 and server 130.

In S250, the search results are received at the querying server 130 to filter results that would best serve the user providing the input multimedia element. The filtering of results may be performed based on the user's intent that can be derived by the querying server 130 using, for example, the user's experience or similar users' experiences, received by an add-on (not shown) installed in the web-browser. The add-on is configured to track the users' activity.

Figure 4:
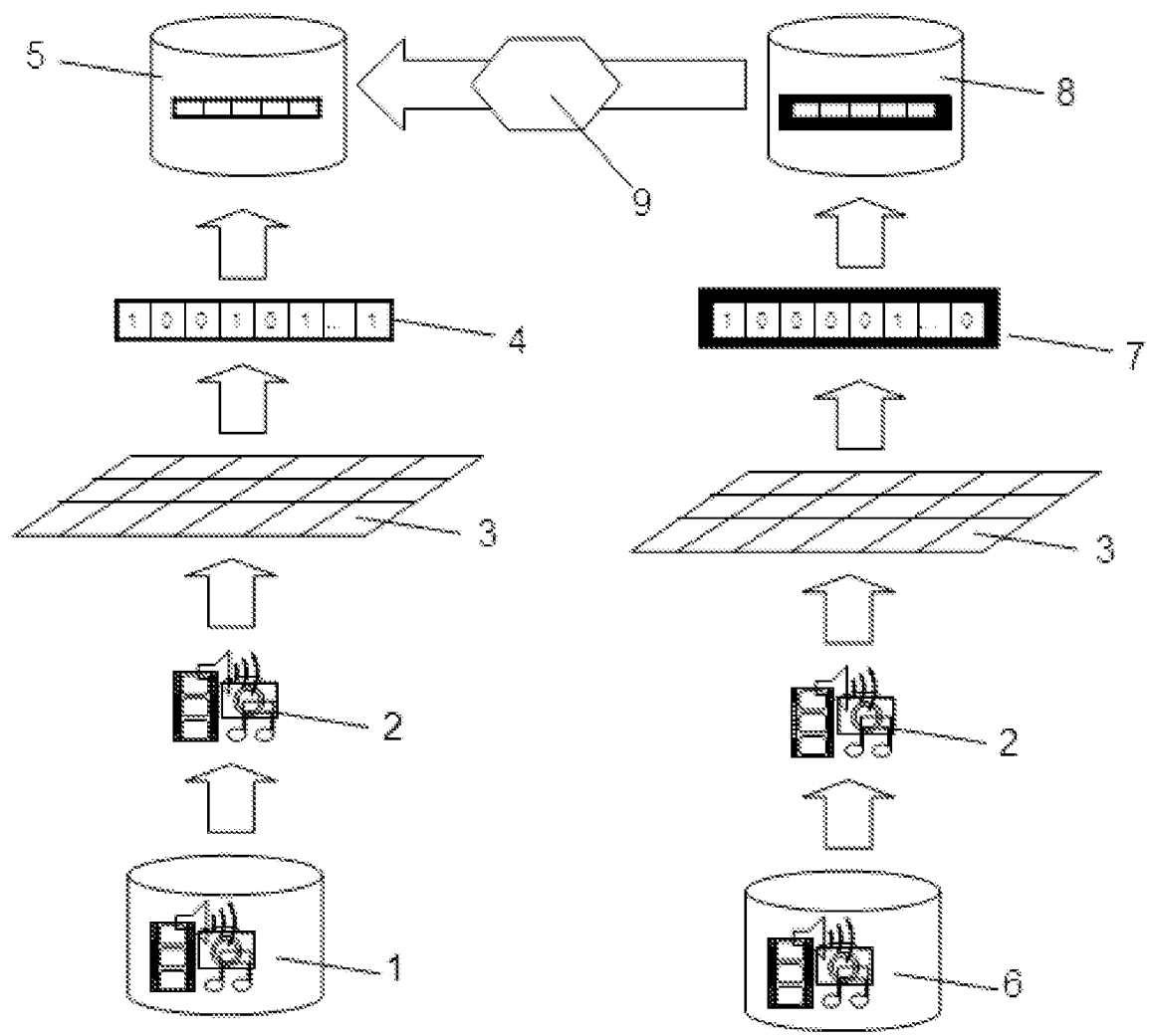
FIG. 4 is a diagram depicting the basic flow of information in the signature generator system.

Alternatively or collectively, the search results may be filtered by matching multimedia element retrieved through the search of the textual search query to the input multimedia element. Such matching is performed by generating signature(s) for the retrieved multimedia element and matching such signature(s) to a signature of the input multimedia element. An exemplary matching process that can be utilized for this purpose is illustrated in FIG. 4.

The filtered search results can serve to detect web advertisements that would be of interest for the user. Matching web advertisements can be detected as described in the co-pending U.S. patent application Ser. No. 13/624,397 assigned to common assignee, which is hereby incorporated by reference for all the useful information it contains.

In S260, the filtered results are sent to the web browser (e.g. browser 120-1) for a display. In S270 it is checked whether additional multimedia element is received as a search query, and if so, execution continues with S210; otherwise, execution terminates.

Following is a non-limiting example for operation of the method described in FIG. 2. The querying server 130 receives an image of a man wearing a hat. The image is then analyzed and a plurality of signatures is generated respective thereto. In order to determine the user's exact intent, a search box is created over the image and an indicator that the user's intent relates to the hat shown in the image is received. Respective of the image signature and the user's intent a textual search query is generated, for example, "Giants championship 2012 hat". The search results using the generated query are generated and displayed. Such results may be, for example, one or more links to purchase the hat on eBay®, one or more additional images of hats, one or more images of the hat from different angles, one or more videos that contains video-shots of the hat, and so on.

Figure 3:
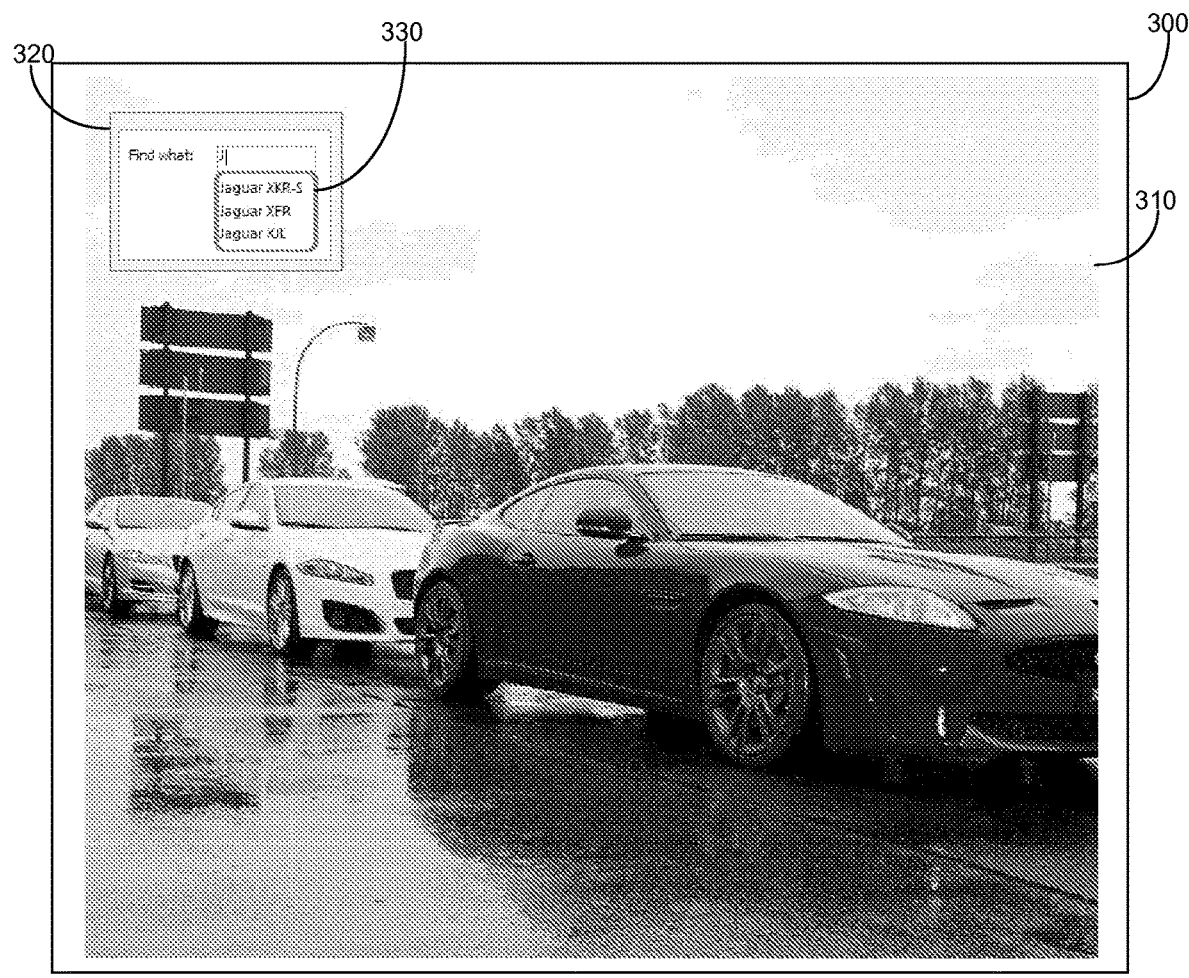
FIG. 3 is a screenshot of a web page displayed on a device illustrating the creation of an overlay object over an image that enables enhancement of the search according to one embodiment.

Another example for the operation of the disclosed method is provided in FIG. 3, which depicts an exemplary and non-limiting screenshot of a web page 300 illustrating the creation of an overlay over an image received as a search query according to an embodiment. The web page 300 is displayed on a web browser of a client's device.

The querying server 130 receives an image 310 as a search query. A plurality of signatures is generated by the SGS 140 respective of the plurality of elements shown in the image. For example, a signature can be created for each car in the image 310. An overlay search box 320 is then created to enable the user to focus the search and enhance the search experience. In the overlay search box 310, the one or more textual search queries 330 as generated by the querying server 130 are displayed. The queries are respective of each portion of the image 310. For example, queries are related to the different car models shown in the image 310. Respective of the input received through the search box 320, a modified search can be initiated.

Figure 5:
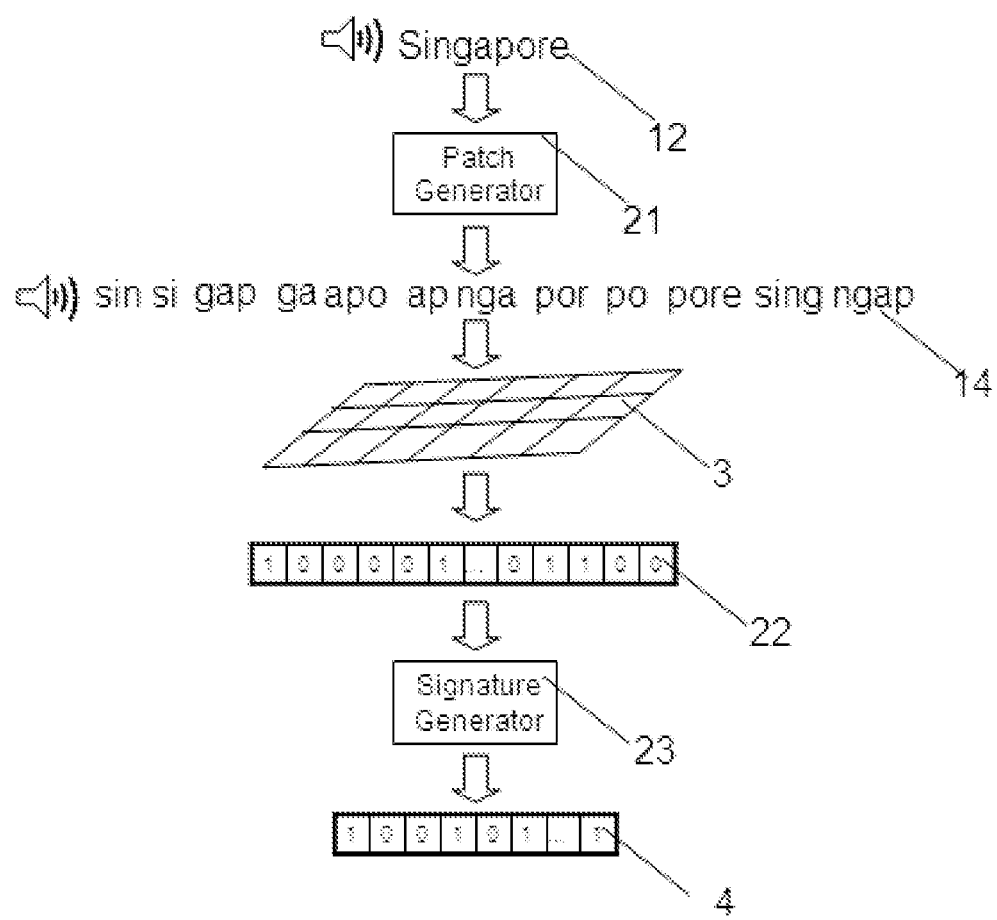
FIG. 5 is a diagram showing the flow of patches generation, response vector generation, and signature generation in a large-scale speech-to-text system.

FIGS. 4 and 5 illustrate the generation of signatures for the multimedia elements by the SGS 140 according to one embodiment. An exemplary high-level description of the process for large scale matching is depicted in FIG. 4. In this example, the matching is for a video content.

Video content segments 2 from a Master database (DB) 6 and a Target DB 1 are processed in parallel by a large number of independent computational Cores 3 that constitute an architecture for generating the Signatures (hereinafter the "Architecture"). Further details on the computational Cores generation are provided below. The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 5. Finally, Target Robust Signatures and/or Signatures are effectively matched, by a matching algorithm 9, to Master Robust Signatures and/or Signatures database to find all matches between the two databases.

To demonstrate an example of signature generation process, it is assumed, merely for the sake of simplicity and without limitation on the generality of the disclosed embodiments, that the signatures are based on a single frame, leading to certain simplification of the computational cores generation. The Matching System is extensible for signatures generation capturing the dynamics in-between the frames.

The Signatures' generation process is now described with reference to FIG. 5. The first step in the process of signatures generation from a given speech-segment is to break down the speech-segment to K patches 14 of random length P and random position within the speech segment 12. The breakdown is performed by the patch generator component 21. The value of the number of patches K, random length P and random position parameters is determined based on optimization, considering the tradeoff between accuracy rate and the number of fast matches required in the flow process of the querying server 130 and SGS 140. Thereafter, all the K patches are injected in parallel into all computational Cores 3 to generate K response vectors 22, which are fed into a signature generator system 23 to produce a database of Robust Signatures and Signatures 4.

In order to generate Robust Signatures, i.e., Signatures that are robust to additive noise L (where L is an integer equal to or greater than 1) by the Computational Cores 3, a frame $\Psi$ is injected into all the Cores 3. Then, Cores 3 generate two binary response vectors: $\vec{S}$ which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core $C_i=\{n_i\}$ (1≤i≤L) may consist of a single leaky integrate-to-threshold unit (LTU) node or more nodes. The node $n_i$ equations are:

$$V_i = \sum_j w_{ij} k_j$$

$$n_i = \Box(Vi - Th_x)$$

where, $\Box$ is a Heaviside step function; $w_{ij}$ is a coupling node unit (CNU) between node i and image component j (for example, grayscale value of a certain pixel j); $k_j$ is an image component 'j' (for example, grayscale value of a certain pixel j); Thx is a constant Threshold value, where x is 'S' for Signature and 'RS' for Robust Signature; and Vi is a Coupling Node Value.

The Threshold values $Th_x$ are set differently for Signature generation and for Robust Signature generation. For example, for a certain distribution of values (for the set of nodes), the thresholds for Signature ($Th_S$) and Robust Signature ($Th_{RS}$) are set apart, after optimization, according to at least one or more of the following criteria:

For: $V_i > Th_{RS}$ $$1-p(V>Th_S)-1-(1-\varepsilon)^l \ll 1 \qquad 1:$$

i.e., given that l nodes (cores) constitute a Robust Signature of a certain image I, the probability that not all of these l nodes will belong to the Signature of a same, but noisy image, $\tilde{\text{ }}$ is sufficiently low (according to a system's specified accuracy).

$$p(V_i > Th_{RS}) \approx l/L \qquad 2:$$

i.e., approximately l out of the total L nodes can be found to generate a Robust Signature according to the above definition.

3: Both Robust Signature and Signature are generated for certain frame i.

It should be understood that the generation of a signature is unidirectional, and typically yields lossless compression, where the characteristics of the compressed data are maintained but the uncompressed data cannot be reconstructed. Therefore, a signature can be used for the purpose of comparison to another signature without the need of comparison to the original data. The detailed description of the Signature generation can be found U.S. Pat. Nos. 8,326,775 and 8,312,031, assigned to common assignee, is hereby incorporated by reference for all the useful information it contains.

A Computational Core generation is a process of definition, selection, and tuning of the parameters of the cores for a certain realization in a specific system and application. The process is based on several design considerations, such as:

(a) The Cores should be designed so as to obtain maximal independence, i.e., the projection from a signal space should generate a maximal pair-wise distance between any two cores' projections into a high-dimensional space.

(b) The Cores should be optimally designed for the type of signals, i.e., the Cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power.

(c) The Cores should be optimally designed with regard to invariance to a set of signal distortions, of interest in relevant applications.

Detailed description of the Computational Core generation and the process for configuring such cores is discussed in more detail in the co-pending U.S. patent application Ser. No. 12/084,150 referenced above.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for searching a plurality of information sources using a multimedia element, comprising:

receiving at least one multimedia element;

generating, by a signature generator, for the at least one multimedia element at least one signature that is unidirectional, and yields compression;

generating at least one textual search query using the at least one signature; wherein the generating of the textual search query comprises: (a) searching for at least one matching stored signature that matches one or more of the at least one signature; and (b) using a mapping between stored signatures and textual search queries, selecting at least one textual search query mapped to at least one matching stored signature;

searching the plurality of information sources using the at least one textual search query;

causing a display of search results retrieved from the plurality of information sources;

creating an overlay on the at least one multimedia element for receiving at least one search parameter representing an intent of the user;

wherein the at least one multimedia element includes one or more portions, wherein the method comprises generating a signature for each of the one or more portions of the at least one multimedia element;

wherein a plurality of signatures are mapped to a single textual search query; and clustering any one of signatures generated for the one or more portions of the at least one multimedia element and the at least one signature to generate a clustered signature; and searching the query database using the clustered signature.

2. The method of claim 1, wherein the overlay is at least a search box.

3. The method of claim 1, further comprising: identifying a context of the at least one multimedia element; and generating the at least one textual search query also by using at least one of the context and the clustered signature.

4. The method of claim 3, further comprising: optimizing the at least one textual search query based on at least one of behavior and demographic information of a user providing the at least one multimedia element.

5. The method of claim 1, wherein causing the display of search results retrieved from the plurality of information further comprises: filtering the retrieved search results using the at least one generated signature.

6. The method of claim 1, wherein the at least one generated signature is robust to noise and distortion.

7. The method of claim 1, wherein the at least one multimedia element is at least one of: an image, graphics, a video stream, a video clip, an audio stream, an audio clip, a video frame, a photograph, and images of signals.

8. A non-transitory computer readable medium having stored thereon instructions for causing one or more processing units to execute a method for searching a plurality of information sources using a multimedia element, comprising:

receiving at least one multimedia element; generating for the at least one multimedia element at least one signature that is unidirectional, and yields compression;

generating a textual search query using the at least one generated signature; wherein the generating of the textual search query comprises: (a) searching for at least one matching stored signature that matches one or more of the at least one signature; and (b) using a mapping between stored signatures and textual search queries, selecting at least one textual search query mapped to at least one matching stored signature;

searching the plurality of information sources using the at least one textual search query;

causing a display of search results retrieved from the plurality of information sources;

creating an overlay on the at least one multimedia element for receiving at least one search parameter representing an intent of the user;

wherein the at least one multimedia element includes one or more portions, wherein the method comprises generating a signature for each of the one or more portions of the at least one multimedia element;

wherein a plurality of signatures are mapped to a single textual search query; and clustering any one of signatures generated for the one or more portions of the at least one multimedia element and the at least one signature to generate a clustered signature; and searching the query database using the clustered signature.

9. A system for searching a plurality of information sources using a multimedia element, comprising:

an interface to a network and configured to receive at least one multimedia element;

a signature generator system (SGS) configured to generate for the multimedia element at least one signature that is unidirectional, and yields compression; wherein the signature generator system comprises: a plurality of computational cores configured to receive the at least one multimedia element, each computational core of the plurality of computational cores having properties that are at least partly statistically independent from other of the plurality of computational cores, wherein the properties are set independently of each other core;

a query generator, wherein the query generator is configured to:

generate at least one textual search query using at least one signature generated for the received at least one multimedia element, by (a) searching for at least one matching stored signature that matches one or more of the at least one signature; and (b) using a mapping between stored signatures and textual search queries, selecting at least one textual search query mapped to at least one matching stored signature;

search the plurality of information sources using the at least one textual search query; and cause a display of search results retrieved from the plurality of information sources on a user device.

10. The system of claim 9, wherein the at least one signature is robust to noise and distortion.

11. The system of claim 9, wherein the query generator further comprises: a database for maintaining mappings between stored signatures and respective textual search queries.

12. The system of claim 11, wherein the query generator is further configured to: cluster the at least one signature for each of the at least one multimedia element; identify a context of the at least one multimedia element; and generate the textual search query by also using at least one of the clustered signature, and the context.

13. The system of claim 12, wherein the query generator is further configured to optimize the textual search query based on at least one of behavior and demographic information of a user providing the at least one multimedia element.

14. The system of claim 9, wherein the query generator is further configured to: create an overlay for receiving at least one search parameter respective of an intent of a user, wherein the overlay is at least a search box.

15. The system of claim 9, wherein the query generator is further configured to: filter the retrieved search results using the at least one signature.

16. The system of claim 9, wherein the multimedia element is at least one of: an image, graphics, a video stream, a video clip, an audio stream, an audio clip, a video frame, a photograph, and images of signals.

* * * * *